Sept. 16, 1941.   C. W. P. HEYLANDT   2,255,925
MULTISTAGE INTERNAL COMBUSTION ENGINE
Filed June 21, 1938   3 Sheets-Sheet 1
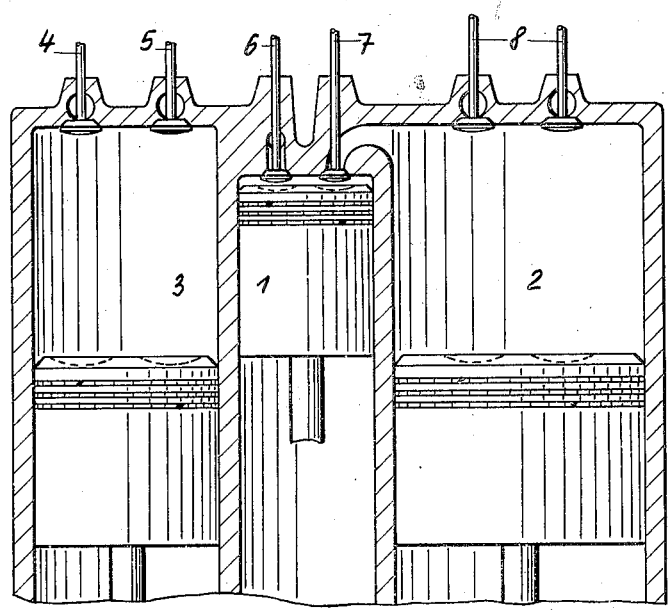
Fig.2.
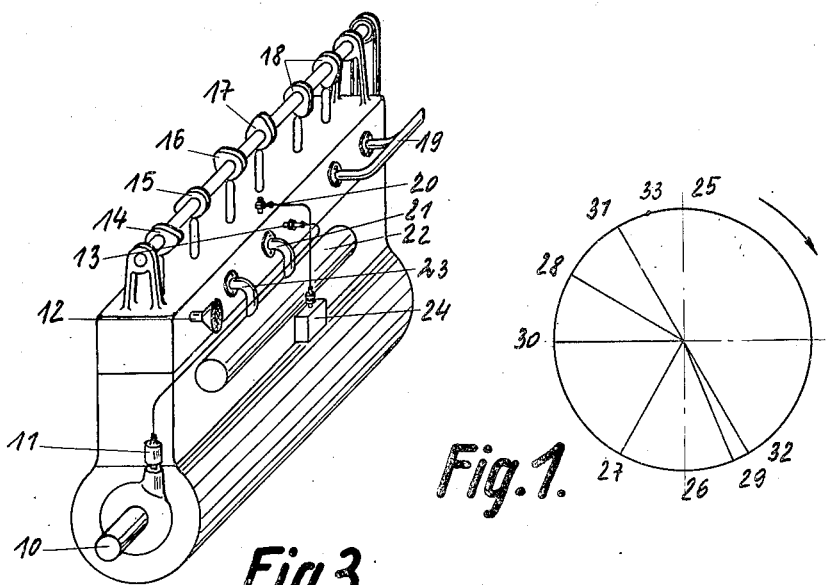
Fig.1.   Fig.3.
Inventor:

Sept. 16, 1941.  C. W. P. HEYLANDT  2,255,925
MULTISTAGE INTERNAL COMBUSTION ENGINE
Filed June 21, 1938  3 Sheets-Sheet 2
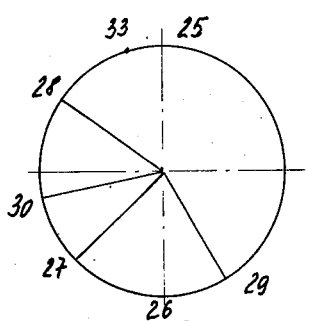
Fig.4.
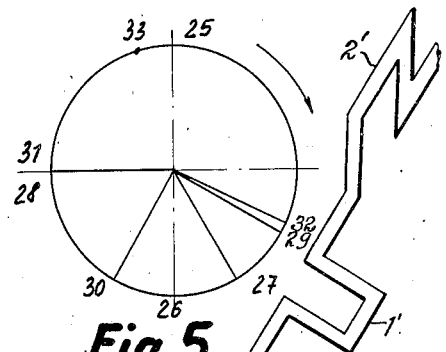
Fig.5.
Fig.6a
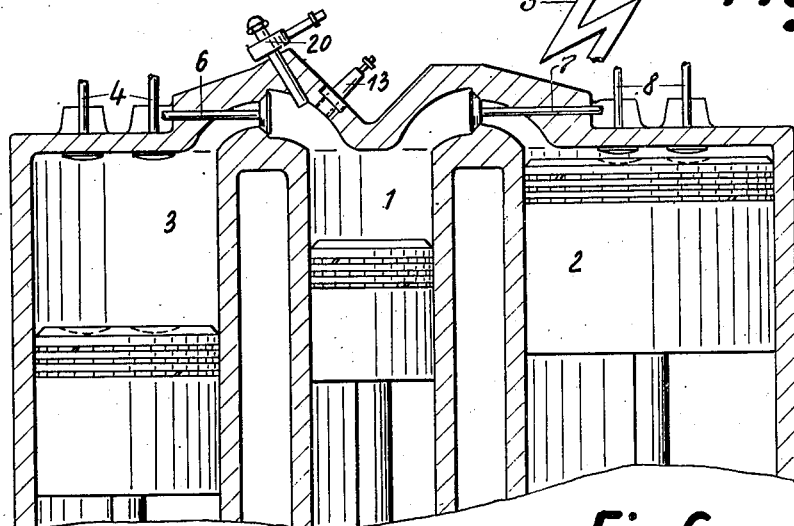
Fig.6.
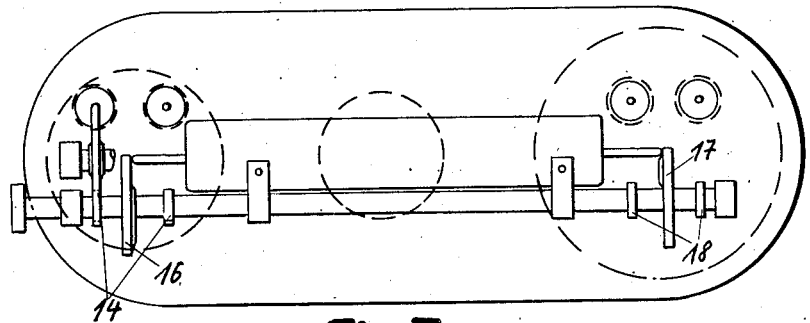
Fig.7.
Inventor:
Christian Wilhelm Paul Heylandt Sept. 16, 1941.   C. W. P. HEYLANDT   2,255,925
MULTISTAGE INTERNAL COMBUSTION ENGINE
Filed June 21, 1938   3 Sheets-Sheet 3

Inventor:
Christian Wilhelm Paul Heylandt

Patented Sept. 16, 1941

2,255,925

UNITED STATES PATENT OFFICE 2,255,925

MULTISTAGE INTERNAL-COMBUSTION ENGINE

Christian Wilhelm Paul Heylandt, Berlin-Britz, Germany

Application June 21, 1938, Serial No. 214,920
In Germany June 29, 1937

7 Claims. (Cl. 60—15)

The present invention relates to two-stroke multi-stage internal combustion engines and to a new and improved method of operating them and has for its object to effect the working of the first and second stage with a small consumption of material and with a running as is the case in a two-stroke single-stage internal combustion engine of usual construction.

The object of the invention is that air preliminarily compressed in a separate compressor cylinder is introduced into the combustion cylinder during substantially one-half the inward or upward stroke of said combustion cylinder piston, whereby the desired compression pressure is insured when the piston continuing to move along its path reaches the end of the compression stroke. In other words, only a portion of the upward stroke of said piston is effective for the compression, and the higher the pressure of the introduced precompressed air the shorter is the part of the stroke that compresses the charge. Hereby the combustion pressure, the pressure towards the end of the working stroke of the combustion stage and the temperature towards the end of this stroke are substantially the same as in a usual one-stage combustion engine with a supercharge up to 100% so that the strain upon the material is also not greater than in case of these commonly used motors.

A further object of the invention is that the introducing of the air, which is precompressed to about 2 atmospheres or more, begins shortly after the beginning of the exhaust of the products of combustion from the combustion cylinder into the second expansion cylinder at a pressure higher than the remaining pressure of the products of combustion so that these are blown out while the new charge of precompressed air is introduced into the cylinder of the combustion stage. In this case the air inlet valve opens after the transfer valve has been opened and after the bottom dead centre has been passed. This has inter alia the advantage that the pressure of preliminarily compressed air may be kept considerably lower.

Further the invention consists therein that the exhaust of products of combustion is finished while the introducing of the new charge of air is continued. This is attained by the closing of the transfer valve before the air inlet valve has closed. Owing to the smaller overlap between the opening of the air inlet valve and the closing of the transfer valve less scavenging air enters the cylinder of the second expansion stage so that its total charge is smaller.

A further object of the invention is that the internal combustion engine has in combinative association three cylinders, a compressor cylinder, a combustion cylinder and a second expansion cylinder, which are connected to cranks in such a manner that the crank of the compressor cylinder is advanced 120° relative to the crank of the combustion cylinder and that the cranks of the second expansion cylinder is retarded 120° with respect to the crank of the combustion cylinder.

In case of this arrangement the method of driving two-stroke multi-stage combustion engines is particularly simple, which is also the object of the present invention. While the piston of the combustion cylinder has still to pass over an angle of 60° until the lower dead centre is reached the piston of the second expansion stage is just in the top dead centre. If at this moment the transfer valve opens then, when the piston of the combustion cylinder has reached the lower dead centre and the piston of the second expansion stage has already passed over one-fourth of the length of its downward stroke, the pressure in both cylinders will amount to from 2 to 3 atmospheres. In this position of the piston of the combustion cylinder the piston of the compressor cylinder has passed over three-fourths of the length of its upward stroke so that the new charge of air is compressed to about 4 atmospheres and is transferred from the compressor cylinder directly into the combustion cylinder.

Upon the accompanying drawings I have illustrated various forms of the engine embodying my present invention, in which:

Fig. 1 is a diagram showing the opening periods of the valves for one revolution of the crankshaft relative to the positions of the crank of the combustion stage.

Fig. 2 is a longitudinal section through one of these forms and

Fig. 3 is a perspective view of the engine according to Fig. 1.

Figs. 4 and 5 are diagrams showing the opening periods of the valves for one revolution of the crankshaft relative to the positions of the crank of the combustion stage.

Fig. 6 is a longitudinal section of another form of this engine and

Fig. 7 is a plan of Fig. 6.

Figure 8:
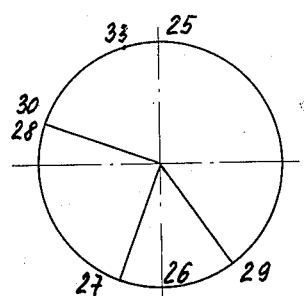
Figs. 8 and 9 are diagrams showing the opening periods of the valves for one revolution of the crankshaft relative to the positions of the crank of the combustion stage.
Figure 9:
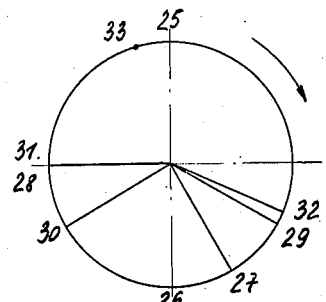
Figure 10:
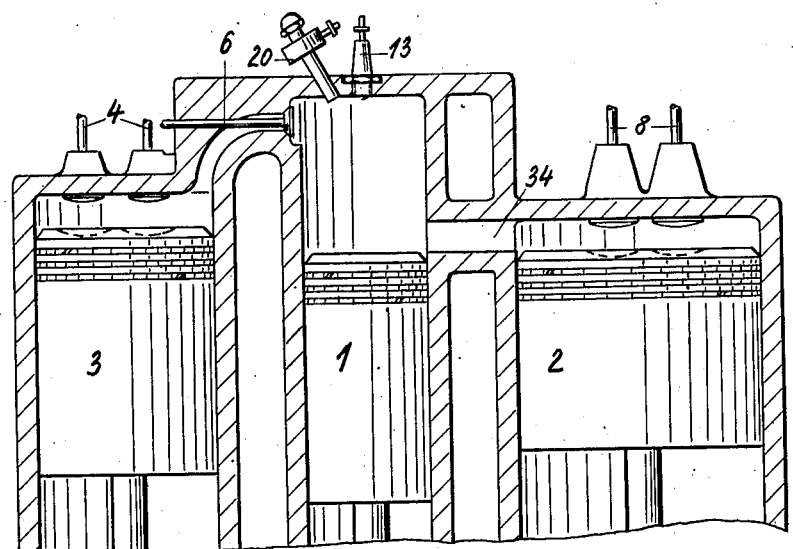
Fig. 10 is a longitudinal section of a third form of this engine.
Figure 11:
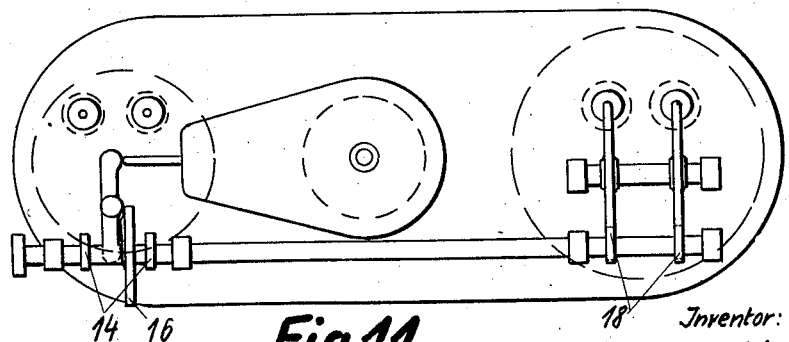

Fig. 11 a plan of Fig. 10.

Fig. 6a is a diagrammatical perspective illustration of the crank shaft employed in the modifications shown in Figs. 6 and 7.

In the following the application of the process is explained as applied to some modes of example of multi-stage motors.

According to Fig. 2 in which a longitudinal section and Fig. 3 in which a perspective view is shown, an expansion stage 2 in a compound arrangement is added to the combustion stage 1, while the compressor 3 conducts via a receiver 22 the compressed air to the combustion stage.

In Fig. 2 numeral 4 denotes the suction valve and 5 the pressure valve of the compressor, 6 the inlet valve and 7 the transfer valve of the combustion stage and 8 the outlet valves of the expansion stage. In this case all valves are shown closed without consideration of the shown position of the piston. The actual times of opening may be ascertained in Fig. 2 from the position and shape of the cams and from the controlling diagram in Fig. 1. In this diagram the top dead centre of the piston of the combustion stage corresponds to the point 25 and the lower dead centre to the point 26. Shortly before the point 26 is reached the transfer valve 7 opens at the point 29 and closes at the point 30. The air inlet valve 6 opens at the point 27 and closes at the point 28. The point 33 denotes the ignition by means of a sparking plug at constant volume-combustion or the beginning of the injection of liquid fuel at constant pressure-combustion. In addition thereto 31 denotes "outlet of the expansion stage opened" and 32 "outlet of the expansion stage closed." In case of the engine according to Figs. 2 and 3 the crankshaft 10 is formed in such a manner that the cranks of the compressor and of the expansion stage are displaced with regard to the crank of the combustion power stage by 180°.

In the perspective illustration in Fig. 3, numerals denote parts as follows:

| | |
|---|---|
| Cams of the compressor suction valve | 14 |
| Cams of the compressor pressure valve | 15 |
| Cams of the inlet of the combustion power stage | 16 |
| Cams of the transfer valve | 17 |
| Cams of the outlet valve of the expansion stage | 18 |
| Suction of the compressor | 12 |
| Pressure branch of the compressor | 23 |
| Filling branch for the combustion stage | 21 |
| Exhaust of the expansion stage | 19 |
| Ignition-distributor | 11 |
| Combustible injecting pump | 24 |
| Spark plug | 13 |
| Injection nozzle | 20 |

The springs of the valves have not been shown in order to avoid that the illustration is made indistinct. The number of revolutions of the cams is the same as that of the crankshaft.

In Fig. 7 the plan and in Fig. 6 a longitudinal section of a further construction of a motor is illustrated where the compressor stage 3 as well as the expansion stage 2 works with the combustion stage 1 in a compound effect. In consequence thereof the pressure valve of the compressor stage may be omitted, since the inlet valve 6 of the combustion stage 1 takes over the function thereof. In the plan only a small piece of the rocking lever shaft with the extreme left rocking lever is shown so that the arrangement of the cams may be seen in a clear manner. The remaining reference marks are the same as those of Figs. 2 and 3 inclusive of the controlling circle Fig. 1.

In Fig. 6a is diagrammatically illustrated the arrangement of the crank shaft employed in the modification of my engine shown in Figs. 6 and 7. This crank is provided with cranks 1', 2', and 3', which cranks correspond to and are designed to be connected, respectively, with the pistons of combustion cylinder 1, of secondary expansion cylinder 2, and of air compressor 3. Crank 3' of the compressor piston leads the crank of the combustion cylinder piston by 120°, while the crank of the secondary expansion piston lags by 120° in respect to crank 1' of the combustion cylinder piston. In Fig. 6 again all valves have been shown closed independently from the chosen position of the pistons. The springs of the valves have also been omitted. The number of revolutions of the cams and of the cranks are equal.

Figs. 4, 5, 8 and 9 are diagrams showing the opening periods of the valves in which the same reference marks have been given as in Fig. 1.

According to Fig. 10 in a longitudinal section and to Fig. 11 in a plan a mode of example has been illustrated in which the transfer valve is replaced by a slot which is controlled by the pistons of the combustion stage. This is achieved thereby that the piston of the combustion stage in its bottom dead centre is arranged with its head in the same line with the bottom edge of the transfer port, and the piston of the expansion stage in its top dead centre is arranged with its head in line with the top edge of the transfer valve. This difference in the distance of the piston head from the centre of the crankshaft is obtained by different lengths of the connecting rod or different distances of the centre of the piston bolt from the piston head (generally referred to as the compression height) or by strokes differing in lengths.

The reference marks are the same as those of Figs. 6 and 7 in which 34 denotes the transfer port, and in the controlling diagram 29 the time is given when the piston of the combustion power stage commences to open the transfer port and 30 when this port is closed again.

In the plan the rocking levers of the suction valves 4 of the compressor have not been shown; their arrangement is however the same as that of the rocking lever of the outlet valve 8 of the expansion stage. The arrangement of the cranking of the crankshaft is the same as described in Figs. 6 and 7. The fundamental element shown in Figs. 5–8, which consists of a compressor, a combustion stage and an expansion stage, may be combined in several repetitions as a series- or a V- or a star- or a boxer-motor.

The operation of all modes of construction of the present process may take place with constant-volume- or constant-pressure-combustion and the expansion may be effected in the second stage as compound-expansion. In addition thereto, when carrying out the process, the combustible may be introduced directly in a solid, liquid or gaseous state, mixed with the compressed air or separate therefrom directly into the combustion cylinder.

I claim as my invention:

1. A two stroke cycle compound expansion internal combustion engine comprising a compression cylinder, a combustion cylinder in which combustion and primary expansion take place, a secondary expansion cylinder, a piston for each of said cylinders having a connecting rod, a crank-shaft having separate cranks to which said connecting rods are operatively connected, the compressor crank leading the combustion cylinder crank by 120 degrees, and the secondary expansion cylinder crank lagging the combustion cylinder crank by 120 degrees, a passage for air compressed in said compressor cylinder, having communication with said combustion cylinder, means controlling communication between said compressed air passage and said combustion cylinder, a conduit connecting said combustion cylinder and said secondary expansion cylinder and means controlling said conduit and arranged to open said conduit shortly before said combustion cylinder piston reaches its outer dead center to permit passage of burned gases from said combustion cylinder, said communication controlling means opening at substantially the same time as said conduit controlling means and permitting transfer of preliminarily compressed air into said combustion cylinder during substantially one half the inward or upward stroke of said combustion cylinder piston, said conduit controlling means being arranged to close said conduit before said communication controlling means is closed.

2. In a two cycle compound expansion internal combustion engine, an air compressor, a combustion cylinder serving as a primary stage of expansion, and a secondary expansion stage cylinder, a piston for each of said cylinders, connecting rods for each piston, a crank-shaft having separate cranks to which said connecting rods are operatively connected, the crank of the piston for the secondary expansion cylinder lagging the combustion cylinder crank by 120 degrees, a passage connecting the air compressor with the combustion cylinder, means for controlling said passage, another passage connecting said combustion cylinder with said second stage expansion cylinder, means for controlling said second passage and arranged to open the latter before said combustion cylinder piston reaches its outer dead center to permit passage of the expanding gases from the combustion cylinder, said second passage controlling means opening prior to the first passage controlling means, thus facilitating an initial transfer of combustion gases into the secondary stage expansion cylinder, whereupon the introduction of pre-compressed air from the compressor into the combustion cylinder takes place through said first passage, followed by an additional transfer of the combined air and gas mixture during less than one half the inward stroke of the combustion cylinder piston, said second passage controlling means being arranged to close before said first passage controlling means closes.

3. The method of operating a two cycle compound expansion internal combustion engine, which comprises injecting into and igniting a fuel charge in the combustion cylinder, in the presence of a compressed gas mixture composed of combustion products and pre-compressed air; transferring the products of the now resulting combustion, during and after primary expansion, from the combustion cylinder into the expansion cylinder, for a secondary expansion, such transfer commencing when the piston of the combustion cylinder approaches its outer dead center during its outward or power stroke, and ending when the piston reaches the vicinity about mid- way of its inward or compression stroke; introducing into the combustion cylinder pre-compressed air, to mix and to be transferred with the combustion products, commencing the air introduction when the combustion cylinder piston has passed the outer dead center, and ending it shortly after the transfer of the gas mixture is terminated; and compressing the untransferred portion of the gas mixture, retained in the combustion cylinder, as its piston approaches and reaches the inner dead center, prior to and after the next injection and ignition of fuel.

4. The method of operating a two cycle compound expansion internal combustion engine, which comprises injecting into and igniting a fuel charge in the combustion cylinder, in the presence of a compressed gas mixture composed of combustion products and pre-compressed air; transferring the products of the now resulting combustion, during and after primary expansion, from the combustion cylinder into the expansion cylinder, for a secondary expansion, such transfer commencing when the piston of the combustion cylinder approaches its outer dead center during its outward or power stroke, and ending when the piston reaches the vicinity about midway of its inward or compression stroke; introducing into the combustion cylinder pre-compressed air, to mix and to be transferred with the combustion products, commencing the air introduction when the combustion cylinder piston has passed the outer dead center, and ending it shortly after the transfer of the gas mixture is terminated, whereby the volume of the charge of introduced pre-compressed air approximates one half of the total piston displacement volume of the combustion cylinder; compressing the untransferred portion of the gas mixture, retained in the combustion cylinder, as its piston approaches and reaches the inner dead center, prior to and after the next injection and ignition of fuel; preventing, in co-relation with the aforementioned method steps, the escape of gases from the second stage expansion cylinder for a period starting in advance of the commencement of the gas transfer, and ending subsequent to the termination of the introduction of pre-compressed air; and releasing the expanding gas mixture from the second stage expansion cylinder during the last part of the compression period, and prior to the injection and ignition of fuel.

5. The method of operating a two cycle compound expansion internal combustion engine, which comprises injecting into and igniting a fuel charge in the combustion cylinder, in the presence of a compressed gas mixture composed of combustion products and pre-compressed air; causing the transfer of products of the resulting combustion from the combustion cylinder into the expansion cylinder during the travel of the combustion cylinder piston through its lower portion of its outward stroke and through a substantial portion of its subsequent inward stroke; introducing into the combustion cylinder pre-compressed air to mix with the combustion products, after the commencement of the gas transfer and until shortly after its termination; and compressing the gas mixture, still retained at the end of the transfer period, in the combustion cylinder, and prior to and after the next injection and explosion of a fuel charge.

6. The method of operating a two cycle compound expansion internal combustion engine, which comprises injecting into and igniting a fuel charge in the combustion cylinder, in the presence of a compressed gas mixture composed of combustion products and pre-compressed air; causing the transfer of products of the resulting combustion from the combustion cylinder into the expansion cylinder during the travel of the combustion cylinder piston through its lower portion of its outward stroke and through a substantial portion of its subsequent inward stroke, and during the first part of the outward or expansion stroke of the piston of the now closed expansion cylinder; introducing into the combustion cylinder pre-compressed air to mix with the combustion products, after the commencement of the gas transfer and until shortly after its termination, while the expansion cylinder piston continues in its outward movement; compressing the gas mixture, still retained at the end of the transfer period, in the combustion cylinder, and facilitating the escape of expanded gases from the expansion cylinder prior to and after the next injection and explosion of a fuel charge in the combustion cylinder.

7. The method as set forth in claim 6, and wherein the pre-compressed air is introduced at a pressure of at least two atmospheres.

CHRISTIAN WILHELM PAUL HEYLANDT.